(12) United States Patent
Ando

(10) Patent No.: US 7,538,914 B2
(45) Date of Patent: May 26, 2009

(54) IMAGE READING APPARATUS

(75) Inventor: Koichi Ando, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 959 days.

(21) Appl. No.: 10/962,494

(22) Filed: Oct. 13, 2004

(65) Prior Publication Data
US 2005/0094218 A1 May 5, 2005

(30) Foreign Application Priority Data
Oct. 15, 2003 (JP) ............... 2003-354802

(51) Int. Cl.
*H04N 1/04* (2006.01)
(52) U.S. Cl. .................. 358/496; 358/497; 358/498; 358/471
(58) Field of Classification Search ........... 358/496, 358/497, 498, 471, 472, 473, 474, 505, 494; 347/263; 250/239; 382/312; 235/462.01
See application file for complete search history.

(56) References Cited

U.S. PATENT DOCUMENTS

| | | | | |
|---|---|---|---|---|
| 4,686,581 A | * | 8/1987 | Spehrley, Jr. et al. | ........ 358/494 |
| 5,864,130 A | * | 1/1999 | Kahn et al. | ............. 235/462.01 |
| 5,956,072 A | * | 9/1999 | Omura | ........................ 347/263 |
| 6,046,759 A | * | 4/2000 | Kim | ........................... 347/263 |
| 6,301,023 B1 | * | 10/2001 | Hirai et al. | .................. 358/498 |
| 6,311,973 B1 | * | 11/2001 | Tanaka et al. | ............... 271/314 |
| 6,445,836 B1 | * | 9/2002 | Fujiwara | ..................... 382/312 |
| 6,999,211 B2 | * | 2/2006 | Sekiya et al. | ............... 358/498 |
| 7,110,145 B2 | * | 9/2006 | Tsukinowa | .................. 358/474 |
| 7,359,097 B2 | * | 4/2008 | Oomori et al. | .............. 358/498 |

FOREIGN PATENT DOCUMENTS

JP 11-355479 A 12/1999

* cited by examiner

*Primary Examiner*—Houshang Safaipour
(74) *Attorney, Agent, or Firm*—Foley & Lardner LLP

(57) ABSTRACT

An image reading apparatus includes a scanner which has a document table for loading a document on the upper part of a main body, detects optical image information reflected from the document, and reads the document image, a support member for surrounding the main body, a plurality of cushioning members installed between the main body and the support member at the position for supporting the load of the main body for preventing transfer of vibration from the support member to the main body, and at least one adjustable bracket which is mounted on the main body, can adjust the support height of the main body to the support member, and supports the cushioning members.

9 Claims, 5 Drawing Sheets

IMAGE READING APPARATUS

CROSS-REFERENCE TO RELATED APPLICATION

This application is based upon and claims the benefit of priority from the prior Japanese Patent Application No. 2003-354802 filed on Oct. 15, 2003; the entire contents of which are incorporated herein by reference.

FIELD OF THE INVENTION

The present invention relates to an image reading apparatus integrally incorporated in an image forming apparatus such as a copier, a printer, or a facsimile for reading document images.

BACKGROUND OF THE INVENTION

In recent years, in a color multi function peripheral (hereinafter abbreviated to an MFP) incorporating integrally with a copying machine and a printer or additionally a facsimile function and sharing a developed image forming portion, an image forming apparatus integrally incorporating a scanner for irradiating light to a document on a document table, detecting optical image information reflected from the document, and reading a document image in a housing has been widely used. In the scanner for detecting reflected light from a document on the document table and reading a document image, to prevent a reduction in the reading accuracy, it is necessary to prevent the scanner from transfer of external vibration. Conventionally, as disclosed in Japanese Patent Application Publication 11-355479, as a countermeasure for preventing a scanner from transfer of vibration, there is an apparatus for supporting the scanner using vibration-proof rubber.

In the apparatus disclosed in Japanese Patent Application Publication 11-355479, a support frame of an image reading apparatus for storing a line CCD is attached to a housing using a vibration-proof member having a vibration-proof rubber body to prevent transfer of vibration from a floor.

However, the rubber series vibration-proof member of the apparatus disclosed in Japanese Patent Application Publication 11-355479 Publication is for preventing vibration from a floor of an installation place due to walking or vibration due to an operation of the image reading apparatus itself from transfer to the support frame and does not prevent the scanner integrally incorporated in the housing of the image forming apparatus having a image forming portion and a printer portion from transfer of a vibration or a shock generated in the image forming portion or the printer portion. Therefore, in recent years, an apparatus that between the periphery of the scanner and the housing of the image forming apparatus for supporting the scanner, for example, a gelatinous cushioning member is installed to prevent a vibration or a shock generated in the image forming portion or printer portion from transfer to the scanner is in the development stage.

On the other hand, there are some scanners which can optionally select either of a document cover for covering a document table and an automatic document feeder for supplying a document to the document table. However, when a scanner which can optionally select either of the document cover and the automatic document feeder is incorporated integrally in the image forming apparatus, depending on a difference in the weight applied to the scanner, the distortion amount of a cushioning member for supporting the scanner differs.

Therefore, when the standard of the cushioning force of the cushioning member is adjusted to the document cover, if the automatic document feeder is exchanged with a heavy automatic document feeder, the distortion amount of the cushioning member is increased. As a result, the scanner extremely goes down in the housing of the image forming apparatus, thus the bottom of the scanner makes contact with the housing of the image forming apparatus, and there is the possibility that vibration may be transferred to the scanner, and furthermore, the level difference between the document table on the top of the scanner and the top of the housing is increased, and there is the possibility that the document feed may be impeded.

On the other hand, when the standard of the cushioning force of the cushioning member is adjusted to the automatic document feeder, if the document cover is exchanged with a light document cover, the scanner little goes down in the housing, thus the level difference between the document table on the top of the scanner and the top of the housing cannot be kept at an appropriate amount, and there is the possibility that vibration may be transferred from the top side of the housing to the scanner.

SUMMARY OF THE INVENTION

The present invention is intended to provide an image reading apparatus, when integrally incorporating a scanner which can optionally select either of a document cover and an automatic document feeder in an image forming apparatus, even if either of the document cover and the automatic document feeder is mounted in the scanner, that the mounting height of the scanner in the image forming apparatus is not changed, and the level difference between a document table on the top of the scanner and the top of a housing is kept fixed, and the document feed by the automatic document feeder is not impeded, and transfer of a vibration or a shock generated in an image forming portion of the image forming apparatus or a printer portion to the scanner is effectively prevented by a cushioning member, and the document is read with high precision.

According to the present invention, there is provided an image reading apparatus comprising a scanner having a document table configured to load a document on an upper part of a main body, detect optical image information reflected from the document, and read the image document image; a support member configured to surround the main body; a plurality of cushioning members provided between the main body and the support member at a position for supporting a load of the main body for preventing transfer of vibration from the support member to the main body; and at least one adjustable bracket mounted on the main body, capable of adjusting a support height of the main body to the support member, and supporting the cushioning members.

BRIEF DESCRIPTION OF THE DRAWINGS

FIG. 8 is a side view of the stepped screw of the adjustable bracket a part of which is viewed through;

DETAILED DESCRIPTION OF THE PREFERRED EMBODIMENT

Figure 1:
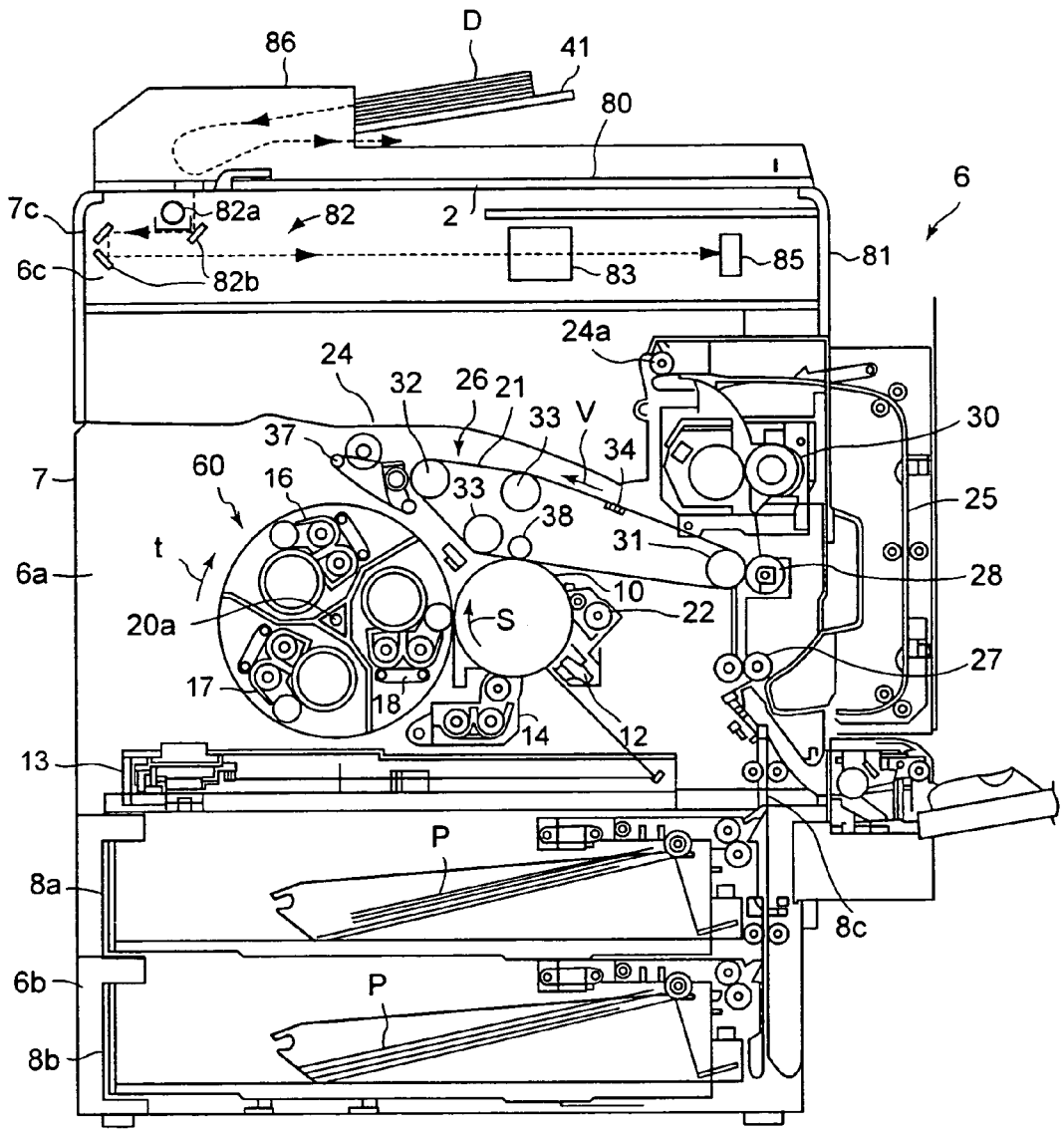
FIG. 1 is a schematic cross sectional view showing an image forming apparatus in which the image reading apparatus of the present invention is incorporated.

FIG. 1 shows the whole of color image forming apparatus 6 in which scanner 6c is integrally incorporated above housing 7 which is a support member. Housing 7 of image forming apparatus 6 has downward printer portion 6a and paper supply portion 6b for supplying recording sheet P which is a recording medium. Paper supply portion 6b takes out recording sheet P from paper supply cassette 8a or 8b and supplies recording sheet P in the direction of aligning roller 27 along conveying path 8c.

Around photosensitive drum 10 of printer portion 6a, in the rotational direction shown by arrow s of photosensitive drum 10, main charger 12 for evenly charging photosensitive drum 10, laser exposure unit 13 for forming a latent image on charged photosensitive drum 10 on the basis of image data from scanner 6c, and revolver type developing device 60 loading black developing unit 14, yellow (Y) developing unit 16, magenta (M) developing unit 17, and cyan (C) developing unit 18 are sequentially arranged.

Furthermore, around photosensitive drum 10, transfer belt device 26 and cleaner device 22 are arranged. Transfer belt device 26 has transfer belt 21 stretched and suspended by driving roller 31, driven roller 32, and tension roller 33 and at the position of primary transfer roller 38, onto transfer belt 21, a toner image on photosensitive drum 10 is transferred primarily. At the secondary transfer position of transfer belt 21, secondary transfer roller 28 for secondarily transferring toner images of a plurality of colors, which are transferred and superimposed on transfer belt 21, on recording sheet P is arranged opposite to each other. Belt cleaning device 37 for removing toner remaining on transfer belt 21 is arranged in contact with transfer belt 21.

Printer portion 6a has fixing device 30 for fixing recording sheet P onto which a toner image is transferred by secondary transfer roller 28, discharge roller 24a for discharging recording sheet P to paper discharge portion 24 after fixing, and reversible conveying device 25 for reversing recording sheet P at the time of forming double-side images.

Figure 2:
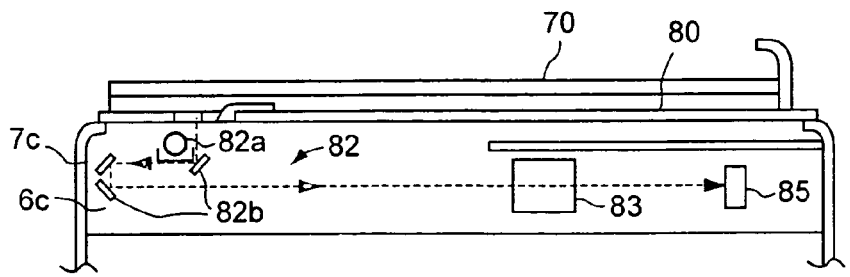
FIG. 2 is a schematic cross sectional view showing the scanner and document cover of the image reading apparatus shown in FIG. 1.
Figure 3:
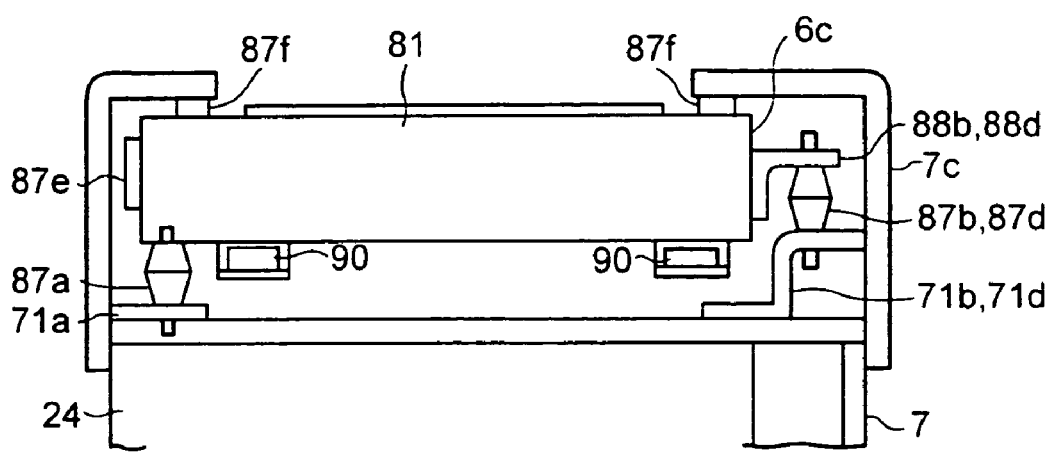
FIG. 3 is a schematic cross sectional view showing the mounting state of the main body of the image reading apparatus shown in FIG. 2 on the scanner support frame.

Scanner 6c has document table 80 for loading original document D on the top of main body 81. Furthermore, as shown in FIGS. 1 and 2, either of document cover 70 for covering document table 80 and automatic document feeder (hereinafter, abbreviated to an ADF) 86 for supplying original document D to document table 80 can be optionally installed selectively.

In main body 81, optical system unit 82 having exposure lamp 82a and mirror 82b, lens 83 for focusing reflected light from original document D led to optical system unit 82, and 4-line CCD sensor 84 are arranged. An electric signal outputted from 4-line CCD sensor 84 is converted to a digital signal by an image processor not drawn, then is data-processed properly, and is supplied to laser exposure unit 13. Laser exposure unit 13 oscillates a laser beam depending on an input electric signal.

Main body 81 is stored in scanner support frame 7c on the upper part of paper discharge portion 24 of housing 7. Main body 81, via first to fourth cushioning members 87a, 87b, 87c, and 87d formed by gelatinous silicon, is supported by scanner support frame 7c. First cushioning member 87a is screwed to the bottom of main body 81 and mounting plate 71a installed on scanner support frame 7c. Second and fourth cushioning members 87b and 87d are screwed to brackets 88b and 88d formed on the side of main body 81 and mounting plates 71b and 71d installed on scanner support frame 7c. Third cushioning member 87c on the left rear side of main body 81 is screwed to adjustable bracket 72 formed on the side of main body 81 and a mounting plate (not drawn) installed on scanner support frame 7c.

Figure 4:
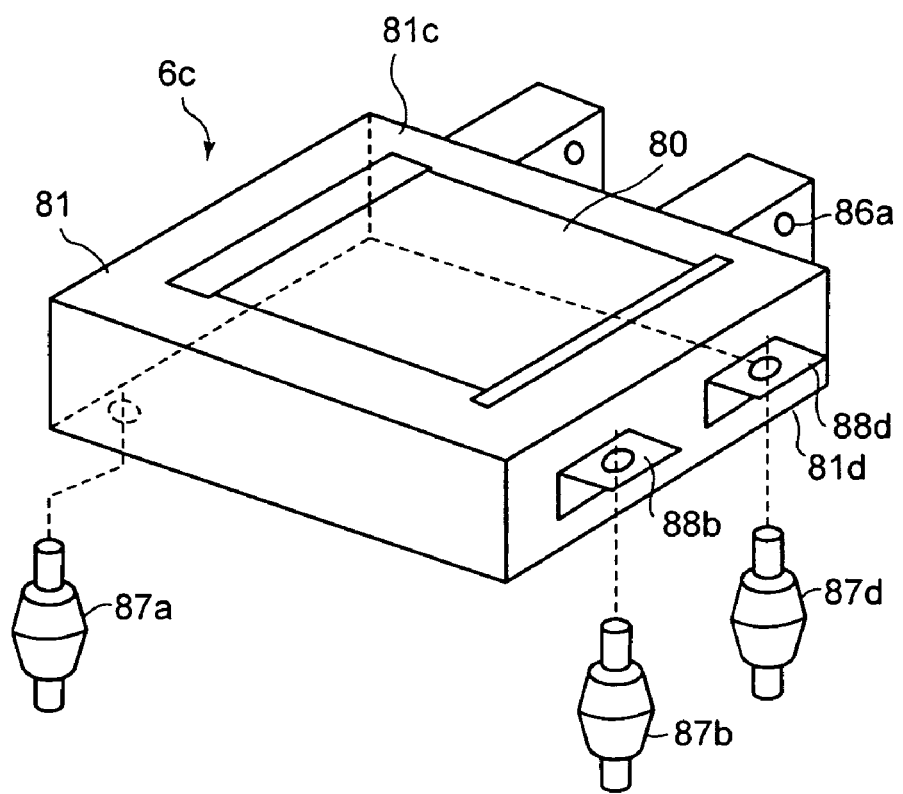
FIG. 4 is an exploded perspective view showing the main body and cushioning members which are dispersed.
Figure 5:
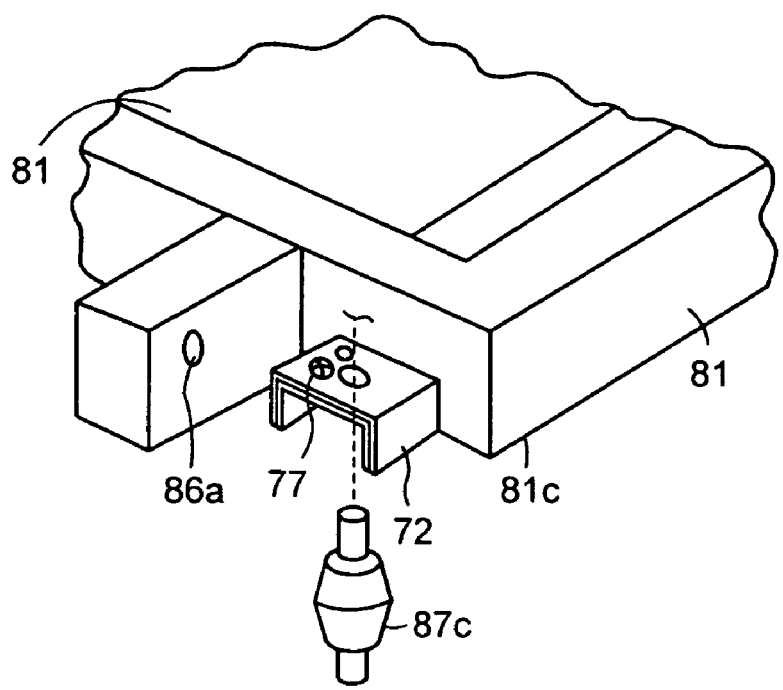
FIG. 5 is an exploded perspective view showing the rear of the main body and adjustable bracket.
Figure 6:
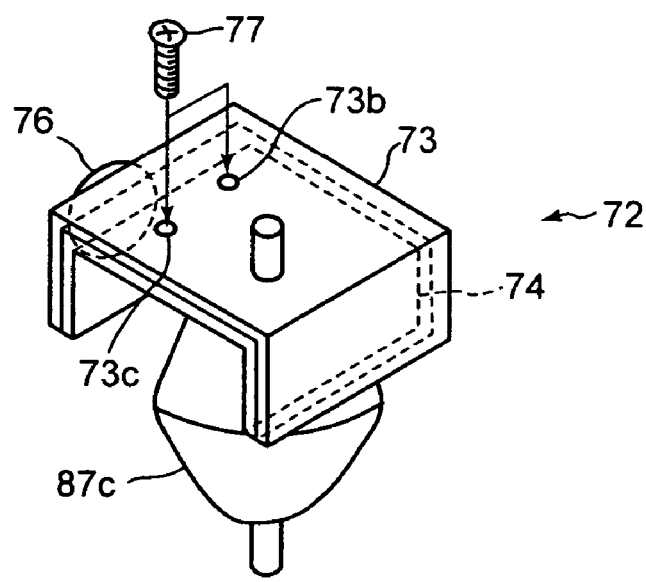
FIG. 6 is a perspective view showing the adjustable bracket and separation screw.
Figure 7:
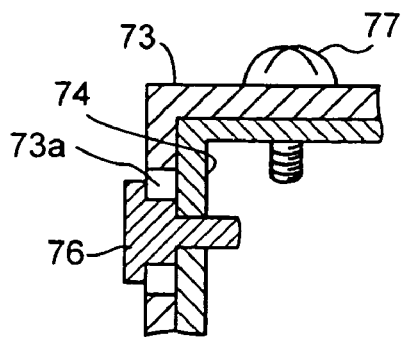
FIG. 7 is a cross section view showing the stepped screw of the adjustable bracket.
Figure 8:
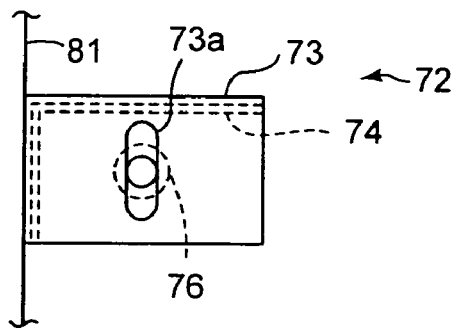

First to fourth cushioning members 87a, 87b, 87c, and 87d, in consideration of the load balance when main body 81 is stopped and the load balance when document cover 70 or ADF 86 is opened, are respectively adjusted in the hardness. In FIG. 4, on left rear side 81c of main body 81, a motor (not drawn) of optical system unit 82 is arranged and the left load of ADF 86 is large, so that when ADF 86 is mounted on scanner 6c, with respect to the load balance applied to the bottom of main body 81, the load on left rear side 81c becomes particularly large. Therefore, if the height of main body 81 is not adjusted and just document cover 70 or ADF 86 is changed, particularly on left rear side 81c, the level difference between the top of main body 81 and the periphery of scanner support frame 7c differs greatly.

Furthermore, on the side of main body 81, flat fifth cushioning member 87e for preventing vibration transfer from scanner support frame 7c is mounted. Further, the periphery of the top of main body 81 is supported by scanner support frame 7c via flat sixth cushioning member 87f. Sixth cushioning member 87f is mounted on the top of main body 81 and scanner support frame 7c by a pressure sensitive adhesive double coated tape. Furthermore, on scanner support frame 7c, flat auxiliary cushioning member 90 which is an auxiliary cushioning member to reduce the deflection amount by the load of first to fourth cushioning members 87a, 87b, 87c, and 87d is mounted.

Next, when ADF 86 is mounted, adjustable bracket 72 with third cushioning member 87c mounted on the left rear side of main body 81 where particularly the load applied to the bottom of main body 81 is increased will be described in detail. As shown in FIGS. 5 to 10, adjustable bracket 72 is composed of upper bracket 73 which is a fixed part fixed to the side of main body 81 and lower bracket 74 which is a movable part which is mounted on upper bracket 73 and slides perpendicularly. On the side of upper bracket 73, long hole 73a is formed and when stepped screw 76 mounted on lower bracket 74 slides on long hole 73a, lower bracket 74 is guided in sliding perpendicular to upper bracket 73.

Figure 9:
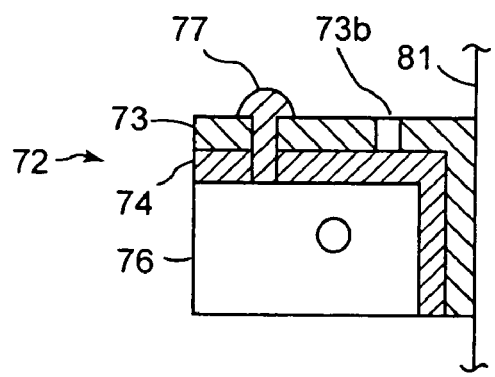
FIG. 9 is a cross sectional view showing the adjustable bracket the separation screw of which is tightened in the second and third screw holes.

On the top of upper bracket 73, first and second screw holes 73b and 73c are formed. At the position overlaid second screw hole 73c of lower bracket 74, third screw hole 74a is formed. First, second, and third screw holes 73b, 73c, and 74a can be screwed by separation screw 77 which is a separation member. As shown in FIG. 9, when upper bracket 73 and lower bracket 74 are adhered to each other, and second and third screw holes 73c and 74a are joined and are screwed by separation screw 77, the height of main body 81 supported by adjustable bracket 72 to third cushioning member 87c is reduced.

Figure 10:
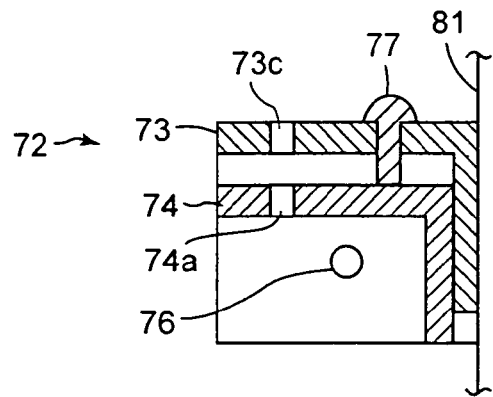
FIG. 10 is a cross sectional view showing the adjustable bracket the separation screw of which is tightened in the first screw hole.

On the other hand, as shown in FIG. 10, when first screw hole 73b of upper bracket 73 is screwed by separation screw 77, front end 77a of separation screw 77 makes contact with the top of lower bracket 74, pushes up lower bracket 74 so that upper bracket 73 and lower bracket 74 are separated from each other, and slides downward lower bracket 74 against upper bracket 73. By doing this, the height of main body 81 supported by adjustable bracket 72 against third cushioning member 87c is increased. For example, assuming the weight of document cover 70 as 1.5 kg and the weight of ADF 86 as 15 kg, adjustable bracket 72 separates upper bracket 73 and lower bracket 74 by about 3 mm and compared with a case that document cover 70 is mounted on scanner 6c, when ADF 86 is mounted on scanner 6c, the scanner is supported higher by about 3 mm by adjustable bracket 72.

Next, the image forming process by the image forming apparatus 6 and the adjustment operation of adjustable bracket 72 will be explained. When document cover 70 is selected as an option of scanner 6c of image forming apparatus 6, to support the left rear side of scanner 6c, adjustable bracket 72 mounted on main body 81 joins second and third screw holes 73c and 74a to each other and screws them by separation screw 77. Therefore, upper bracket 73 and lower bracket 74 are adhered to each other, support low main body 81, and keep the level difference between document table 80 on the top of main body 81 and scanner support frame 7c on the periphery of main body 81 at a proper amount.

On the other hand, when ADF 86 is selected as an option of scanner 6c of image forming apparatus 6, separation screw 77 of adjustable bracket 72 is removed from second and third screw holes 73c and 74a and first screw hole 73b of upper bracket 73 is screwed by it. By doing this, lower bracket 74 makes contact with separation screw 77 and is pushed down by about 3 mm against upper bracket 73. At this time, compared with a case that document cover 70 is mounted, the support height of main body 81 by adjustable bracket 72 is increased by 3 mm.

However, actually, the deflection amount of third cushioning member 87c by the weight of ADF 86 is increased by about 3 mm than that when document cover 70 is mounted, so that the height of scanner 6c in housing 7 becomes the same as that when document cover 70 is mounted and the level difference between document table 80 on the top of main body 81 and scanner support frame 7c on the periphery of main body 81 is kept at a proper amount. Further, compared with document cover 70, the weight of ADF 86 is high as a whole, though on other than the left rear side, the weight difference is sufficient to be supported by the cushioning members 87a, 87b, and 87d, and when either of document cover 70 and ADF 86 is selected, changes in the height of scanner 6c cause little problems.

In the image forming apparatus 6 in which on scanner 6c, document cover 70 or ADF 86 is mounted like this, when the image forming operation is started, and when document cover 70 is mounted, original document D is manually loaded on document table 80, or original document D is supplied onto document table 80 by ADF 86. When ADF 86 is used, the level difference between document table 80 and scanner support frame 7c on the periphery of main body 81 is kept at a proper amount, so that original document D causes no jam and is smoothly loaded on document table 80. Scanner 6c reads reflected light from original document D on document table 80 by 4-line CCD sensor 84, converts it to an electric signal, and inputs it to an image processor (not drawn).

In printer portion 6a, photosensitive drum 10 rotates in the direction of arrow s, is evenly charged by main charger 12 according to the rotation thereof, and is irradiated a laser beam according to a black image signal of original document D by laser exposure unit 13, thus a black electrostatic latent image is formed on photosensitive drum 10 and furthermore is primarily transferred onto transfer belt 21. Photosensitive drum 10 is cleaned residual toner by cleaner 22.

Next, for each color of the toner images, in the same way as with the black (BK) toner image forming process, the rotation and stop of revolver type developing device 60 in the direction of arrow t are repeated, and the cyan (C), magenta (M), and yellow (Y) toner image forming processes are sequentially repeated, and toner images of a plurality of colors are superimposed at the same position on transfer belt 21 to obtain a full-color image. Next, by secondary transfer roller 28, to recording sheet P conveyed from paper supply portion 6b, the full-color toner image on transfer belt 21 is secondarily transferred and is fixed by fixing device 30, and a color image is completed on recording sheet P and recording sheet P is stacked on paper discharge portion 24.

During the image forming process of printer portion 6a, housing 7 generates vibration due to a shock during rotation of revolver type developing device 60, thus scanner support frame 7c also vibrates. However, although the vibration of scanner support frame 7c is transferred to first to sixth cushioning members 87a, 87b, 87c, 87d, 87e, and 87f, by the elastic deformation of first to sixth cushioning members 87a, 87b, 87c, 87d, 87e, and 87f, the transfer of the vibration to main body 81 of scanner 6c is prevented.

Particularly in third cushioning member 87c, when either of document cover 70 and ADF 86 is selected as an option of scanner 6c, the distortion amount thereof differs. However, when separation screw 77 of adjustable bracket 72 is screwed again and lower bracket 74 is moved vertically by sliding, the difference in the distortion amount of third cushioning member 87c can be compensated, and the cushioning force by flat sixth cushioning member 87f between the top of main body 81 and the periphery of scanner support frame 7c is not impaired, and the transfer of vibration to scanner 6c is prevented surely.

Further, during use of image forming apparatus 6, for example, when it becomes necessary to replace document cover 70 with ADF 86, at the time of exchange maintenance, separation screw 77 is removed from second and third screw holes 73c and 74a and is screwed again in first screw hole 73b of upper bracket 73, and the position of scanner 6c to housing 7 is adjusted. Or, when it becomes necessary to replace ADF 86 with document cover 70, at the time of exchange maintenance, separation screw 77 is removed from first screw hole 73b and is screwed again in second and third screw holes 73c and 74a, and the position of scanner 6c to housing 7 is adjusted.

As mentioned above, according to this embodiment, when integrally incorporating scanner 6c in housing 7 of image forming apparatus 6, at the time of mounting document cover 70 or at the time of mounting ADF 86, if the screwing position of separation screw 77 of adjustable bracket 72 installed on left rear side 81c where the load of scanner 6c is large is only changed, the support height of main body 81 by adjustable bracket 72 can be adjusted. Therefore, when either of document cover 70 and ADF 86 is selected, regardless of the difference in the distortion of third cushioning member 87c, the height of scanner 6c in housing 7 can be kept fixed and the level difference between the top of main body 81 and the periphery of scanner support frame 7c can be kept at a proper amount. As a result, original document D can be conveyed smoothly by ADF 86, and the reliability of scanner 6c can be improved, and the cushioning force by each of cushioning members 87a to 87f is not impaired, and regardless of vibration of housing 7, transfer of vibration to scanner 6c integrally incorporated can be prevented, and a document image can be read by scanner 6c with high precision.

Figure 11:
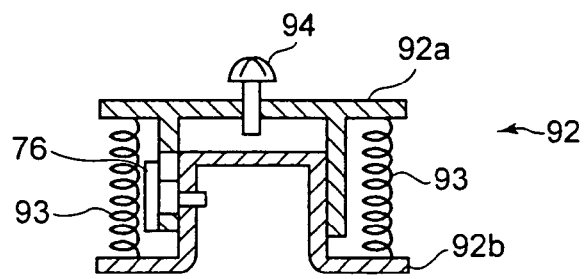
FIG. 11 is a cross sectional view showing the second example of the adjustable bracket.

In FIG. 11, the second example of the adjustable bracket is shown. The second example is an example that in the first example, the structure of the adjustable bracket on the left rear side of the scanner is changed. The same parts as those of the first example are given the same numerals and the explanation thereof is omitted. Adjustable bracket 92 is composed of upper bracket 92a which is a fixed part fixed on the side of main body 81 and a lower bracket 92b which is a movable part which is mounted on upper bracket 92a and slides perpendicularly.

Similarly to the first example, lower bracket 92b is guided by stepped screw 76 and can slide perpendicularly to upper bracket 92a. Upper bracket 92a and lower bracket 92b are always applied with pressing force by compressed spring 93 which is a pressing member in the direction of separation. By screwed by contact screw 94 against the pressing force of compressed spring 93, upper bracket 92a and lower bracket 92b can be adhered to each other. Since upper bracket 92a and lower bracket 92b are screwed by contact screw 94 and are adhered to each other, the height of main body 81 supported by adjustable bracket 92 is reduced.

Further, when contact screw 94 is removed, upper bracket 92a and lower bracket 92b are separated from each other by compressed spring 93 and the height of main body 81 supported by adjustable bracket 92 is raised. Therefore, when document cover 70 is mounted on scanner 6c, upper bracket 92a and lower bracket 92b are screwed by contact screw 94 and the support position of the main body 81 is lowered. On the other hand, when ADF 86 is mounted on scanner 6c, contact screw 94 is removed, and the support position of main body 81 is raised, and regardless of which is mounted, document cover 70 or ADF 86, the level difference between document table 80 on the top of main body 81 and scanner support frame 7c on the periphery of main body 81 is kept at a proper value.

In the second example, only by screwing contact screw 94 or removing contact screw 94, the support height of main body 81 by adjustable bracket 92 can be adjusted. Therefore, similarly to the first example, even if either of document cover 70 and ADF 86 is selected, the level difference between the top of main body 81 and the periphery of scanner support frame 7c can be kept at a proper amount, and the reliability of scanner 6c can be improved by smooth feed of original document D by ADF 86, and transfer of vibration to scanner 6c from housing 7 can be prevented by cushioning members 87a to 87f, and a document image can be read by scanner 6c with high precision.

Further, in place of compressed spring 93, it is possible to use a tension spring, always keep upper bracket 92a and lower bracket 92b adhered to each other, in the same way as with the first example, press down lower bracket 92b by separation screw 77 so as to separate upper bracket 92a and lower bracket 92b from each other, and raise the support position of main body 81.

Figure 12:
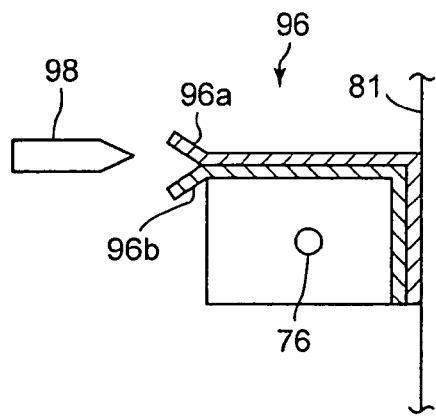
FIG. 12 is a cross sectional view showing the third example of the adjustable bracket.

In FIG. 12, the third example of the adjustable bracket is shown. The third example is an example that in the first example, the structure of the adjustable bracket on the left rear side of the scanner is changed. The same parts as those of the first example are given the same numerals and the explanation thereof is omitted. Adjustable bracket 96 is composed of upper bracket 96a which is a fixed part fixed on the side of main body 81 and a lower bracket 92b which is a movable part which is mounted on upper bracket 96a and slides perpendicularly.

Similarly to the first example, lower bracket 96b is guided by stepped screw 76 and can slide perpendicularly to upper bracket 96a. When document cover 70 is mounted on scanner 6c, upper bracket 96a and lower bracket 96b are made contact with each other by the load of main body 81 and the support position of main body 81 is lowered. On the other hand, when ADF 86 is mounted on scanner 6c, from a guide-shaped end 97 of upper bracket 96a and 96b, between upper bracket 96a and lower bracket 96b, a wedge type spacer 98 which is a separation member is inserted, and upper bracket 96a and lower bracket 96b are separated from each other, and the support position of main body 81 is raised. By doing this, regardless of which is mounted, document cover 70 or ADF 86, the level difference between document table 80 on the top of main body 81 and scanner support frame 7c on the periphery of main body 81 is kept at a proper amount.

In the third example, only by inserting spacer 98 between upper bracket 96a and lower bracket 96b or pulling out spacer 98 from the gap, the support height of main body 81 can be adjusted by adjustable bracket 96. Therefore, similarly to the first example, even if either of document cover 70 and ADF 86 is selected, the level difference between the top of main body 81 and the periphery of scanner support frame 7c can be kept at a proper amount, and the reliability of scanner 6c can be improved by smooth feed of original document D by ADF 86, and transfer of vibration to scanner 6c from housing 7 can be prevented by cushioning members 87a to 87f, and a document image can be read by scanner 6c with high precision.

Further, the present invention is not limited to the aforementioned embodiments and can be modified within the range of the present invention, and the structure of the image forming apparatus is optional, and the pixel size and number of lines of the image sensor of the scanner are not limited.

Further, the cushioning member is not limited, and the material thereof is not limited to silicon, and the hardness thereof is optional according to the load applied to the cushioning member. Furthermore, if the adjustable bracket can adjust the support height of the main body, the structure thereof is not limited, and the mounting position of the adjustable bracket is optional depending on the load balance generated in the main body of the scanner when the document cover is mounted and when the automatic document feeder is mounted and the weight difference between the document cover and the automatic document feeder, and for example, when the whole automatic document feeder is heavy, some or all of a plurality of cushioning members for supporting the load of the main body may be mounted using the adjustable bracket.

According to the present invention, even when either of the document cover and automatic document feeder is selected and mounted on the scanner, the height of the top of the scanner to the support member can be kept at a fixed amount.

Therefore, transfer of a vibration or a shock of the support member side to the scanner can be prevented surely by the cushioning member and a document image can be read with high precision. Further, a document can be fed smoothly by the automatic document feeder and the reliability is improved.

What is claimed is:

1. An image reading apparatus, comprising:
 a scanner having a document table configured to load a document on an upper part of a main body, detect optical image information reflected from the document, and read the image document image;

a support member configured to surround the main body;

a plurality of cushioning members provided between the main body and the support member at a position for supporting a load of the main body for preventing transfer of vibration from the support member to the main body; and at least one adjustable bracket mounted on the main body, capable of adjusting a support height of the main body to the support member, and supporting the cushioning members, wherein on the main body, a document cover for covering the document table or an automatic document feeder for supplying the document to the document table is mounted exchangeably and when mounting the document cover on the main body, the adjustable bracket supports low the main body against the cushioning members, and when mounting the automatic document feeder on the main body, the adjustable bracket supports high the main body against the cushioning members.

2. The image reading apparatus according to claim 1, wherein the adjustable bracket has a fixed part fixed to the main body and a movable part mounted slidably perpendicularly to the fixed part under the fixed part and the cushioning members are mounted on the movable part.

3. The image reading apparatus according to claim 1, wherein the adjustable bracket has a fixed to the main body and a movable part mounted slidably perpendicular to the fixed part and the cushioning members are mounted on the movable part.

4. The image reading apparatus according to claim 1, wherein the adjustable bracket, among the plurality of cushioning members, when the document cover is mounted on the main body, adjusts the support height of the main body at least at a position where a load of the main body is applied.

5. The image reading apparatus according to claim 4, wherein the adjustable bracket has a fixed part fixed to the main body and a movable part mounted slidably perpendicularly to the fixed part under the fixed part and the cushioning members are mounted on the movable part.

6. The image reading apparatus according to claim 5, wherein the adjustable bracket, in a state that a bottom of the fixed part and a top of the movable part are in contact with each other, has a separation member for separating the bottom of the fixed part and the top of the movable part against the load of the main body.

7. The image reading apparatus according to claim 6, wherein the separation member is a separation screw screwed to the fixing part for pushing down the movable part against the fixed part with a front end in contact with the top of the movable part.

8. The image reading apparatus according to claim 6, wherein the separation member is a pressing member having pressing force for separating the bottom of the fixed part and the top of the movable part for removing a contact screw for bringing the fixed part and the movable part into contact so as to stop and separating the bottom of the fixed part and the top of the movable part.

9. The image reading apparatus according to claim 6, wherein the separation member is a spacer inserted between the fixed part and the movable part.

* * * * *